US012700782B2

(12) United States Patent
Walther et al.

(10) Patent No.: US 12,700,782 B2
(45) Date of Patent: Aug. 4, 2026

(54) POSITIONING DEVICE AND METHOD FOR POSITIONING WIRE ENDS IN THE MANUFACTURE OF AN ELECTRICAL MACHINE

(71) Applicant: PRO-BEAM GMBH & CO. KGAA, Gilching (DE)

(72) Inventors: Jorg Walther, Chemnitz (DE); Holger Uhlmann, Lobnitz (DE)

(73) Assignee: Pro-Beam GmbH & Co., KGAA, Gilching (DE)

( * ) Notice: Subject to any disclaimer, the term of this patent is extended or adjusted under 35 U.S.C. 154(b) by 525 days.

(21) Appl. No.: 18/006,547

(22) PCT Filed: Jul. 26, 2021

(86) PCT No.: PCT/EP2021/070898
§ 371 (c)(1),
(2) Date: Jan. 23, 2023

(87) PCT Pub. No.: WO2022/018303
PCT Pub. Date: Jan. 27, 2022

(65) Prior Publication Data
US 2023/0299650 A1 Sep. 21, 2023

(30) Foreign Application Priority Data
Jul. 24, 2020 (DE) ..................... 10 2020 119 587.7

(51) Int. Cl.
*B23P 19/00* (2006.01)
*B21F 3/00* (2006.01)
*H02K 15/35* (2025.01)
(52) U.S. Cl.
CPC ............... *H02K 15/35* (2025.01); *B21F 3/00* (2013.01)

(58) Field of Classification Search
CPC .......... B21F 3/00; H02K 15/22; H02K 15/33; H02K 15/35
See application file for complete search history.

(56) References Cited

U.S. PATENT DOCUMENTS 11,462,976 B2 * 10/2022 Binder ...................... B21F 3/02
12,034,345 B2 * 7/2024 Reiser ...................... H02K 3/50
(Continued)

FOREIGN PATENT DOCUMENTS

EP 3761490 A1 1/2021
JP 2014023184 A 2/2014
(Continued)

*Primary Examiner* — Paul D Kim
(74) *Attorney, Agent, or Firm* — Bishop & Diehl, Ltd.

(57) ABSTRACT

A positioning device (10; 50; 60) for positioning wire ends (14) in the manufacture of an electrical machine (12) has a positioning unit (13) which has an alignment element (22*a*) and a counter-alignment element (22*b*) which are arranged one above the other in two parallel planes (16, 18) and can be displaced relative to each other along a displacement path (34), being at least partially superimposed or superimposable. Thereby, the alignment element (22*a*) has at least one through recess (24*a*) and the counter alignment element (22*b*) has at least one counter through recess (24*b*), which are arranged and designed in such a way that a clear positioning passage (99) perpendicular to the two planes (16, 18) of the alignment element (22*a*) and the counter-alignment element (22*b*), through which the at least one wire ends (14) can extend and the cross-sectional area of which can be varied by displacing the alignment and counter-alignment elements (22*a*, 22*b*) with respect to each other. In order to distort the wire ends as little as possible, the at least one through recess (24*a*) on the aligning element (22*a*) and the at least one counter through recess (24*b*) on the counter-aligning element (22*b*) each have two rectilinear edge sections (30*a*, 30*b*, 30*c*, 30*d*) which run in the respective plane
(Continued)

(16, 18) at an oblique angle to the direction of displacement
(FIG. 3).

15 Claims, 5 Drawing Sheets

(56)                    References Cited

U.S. PATENT DOCUMENTS

| | | |
|---|---|---|
| 12,184,048 B2 * | 12/2024 | Baranowski ........... H02G 1/127 |
| 2018/0166796 A1 | 6/2018 | Yanagisawa et al. |
| 2020/0153319 A1 | 5/2020 | Reiser et al. |

FOREIGN PATENT DOCUMENTS

| | | | |
|---|---|---|---|
| JP | 2015171260 A | 9/2015 | |
| JP | 2017005771 A | 1/2017 | |
| WO | 2020045734 A1 | 3/2020 | |

* cited by examiner

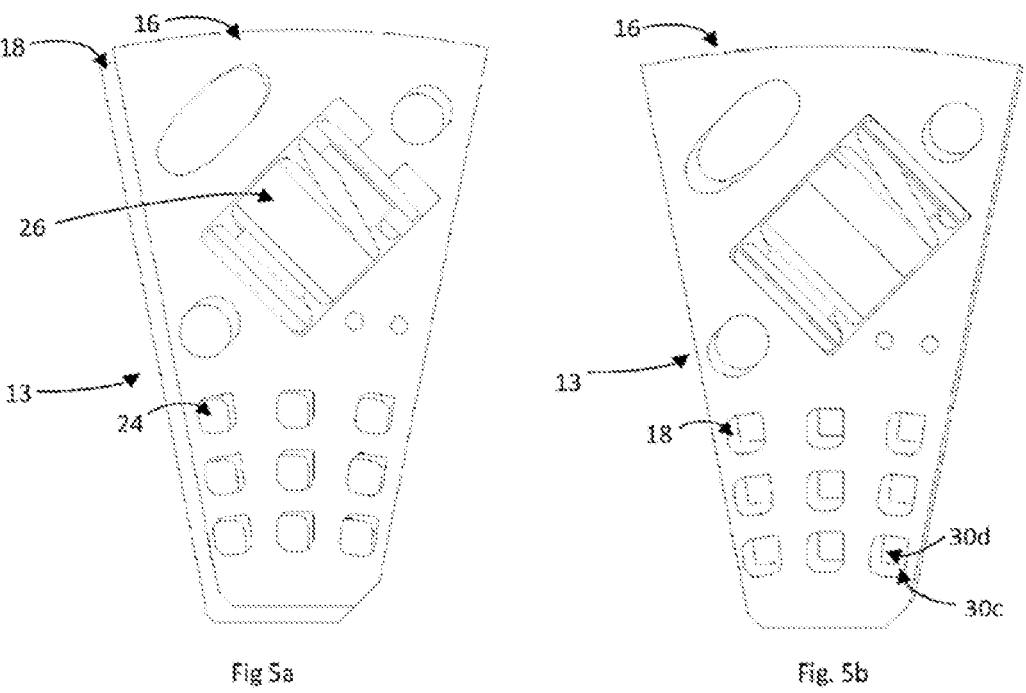
Fig 5a                      Fig. 5b
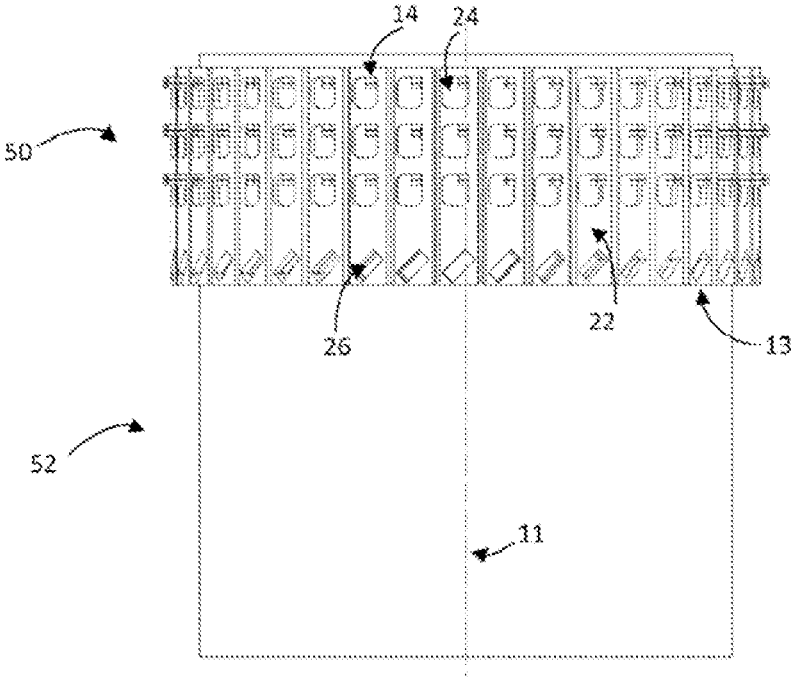
Fig. 6a

POSITIONING DEVICE AND METHOD FOR POSITIONING WIRE ENDS IN THE MANUFACTURE OF AN ELECTRICAL MACHINE

BACKGROUND OF THE INVENTION

1. Field of the Invention

The invention relates to a positioning device for positioning wire ends in the manufacture of an electrical machine.

The invention further relates to a method for positioning and processing wire ends in the manufacture of an electrical machine.

2. Description of the State of the Art

During the manufacturing of electrical machines, such as electric motors, generators and/or transformers, wires, which are used as electrical conductors, for example, in coils of stators and/or rotors, must be arranged and machined in certain assemblies.

In contrast to the examples of such assemblies familiar from school textbooks, in commercially available electrical machines a large number of wires are often used instead of a continuous single wire, and optimized winding techniques are applied to generate, above all, an electromagnetic field that is as optimal as possible. The individual wires must then be connected to each other at their wire ends to produce the desired winding.

Nowadays, flat wires such as hairpins or I-pins are increasingly used for the winding of electric motor stators.

Such flat wires typically have a bent mostly central area as well as two wire ends and are designed in a precisely predetermined shape to make the winding of the stator as tight as possible. In one or more further process steps, the wire ends of the individual flat wires are then connected to each other.

In all process steps in which the wire ends are further processed, the wire ends must be positioned with the highest precision in relation to each other in order to avoid manufacturing errors. Such process steps that require precise positioning include steps such as stripping, cutting and/or joining of the wire ends, with welding and soldering being particularly important in the case of joining.

However, with regard to the positioning of the wire ends, it turned out that, due to the winding of the wires and the sometimes relatively large wire thickness, a considerable amount of force is required to press the wire ends into a suitable position in order to be able to carry out the further process steps.

It is therefore known from the prior art to mount a multi-part clamping device on the assembly to be processed, such as a stator, with which the wire ends are positioned.

Such clamping devices comprise two discs lying one on top of the other and rotatable relative to each other, each of which has aligned openings for the passage of all the wire ends. After the wire ends have passed through the openings, the discs are rotated so that the wire ends are clamped between the now less overlapping openings.

However, it turned out that very high forces are required to actuate the clamping device, which can lead to damage to individual wire ends. In addition, the discs jam as soon as one wire end exhibits dimensional deviations or misalignments, and not all wire ends are completely enclosed.

Other clamping devices known on the market, which use small sheet segments for clamping, require sheet segments arranged in at least three layers to bring the wire ends into position. This results in additional material costs as well as more difficult handling of the clamping device due to the large number of parts. In addition, such clamping devices have a 50% greater thickness for sheet metal segments of the same thickness, since three layers are required to completely enclose the wire ends instead of just two. When using such clamping devices, the length of the wire ends of the electrical machine must be greater by this amount.

Other clamping devices are designed as complex constructions with individual grippers for the respective wire ends. However, the large space requirement and the high costs are of disadvantage here.

SUMMARY OF THE INVENTION

The object of the present invention is therefore to provide a positioning device for positioning the wire ends in the manufacture of an electrical machine, which takes into account some of the above-mentioned disadvantages. In particular, the positioning device should be capable of ensuring the positioning of the wire ends with improved process reliability.

According to the invention, this problem is solved by a positioning device for positioning wire ends in the manufacture of an electrical machine, comprising:

a) at least one positioning unit, which b) an alignment element and a counter-alignment element, which are arranged in two layers one above the other and are displaceable relative to one another along a displacement path, wherein they are at least partially superimposed or can be superimposed, c) wherein the alignment element has at least one through recess and the counter-alignment element has at least one counter through recess, which are arranged and designed in such a way that a clear positioning passage remains perpendicular to the two layers of the alignment element and the counter-alignment element, through which at least one wire end can extend and the cross-section of which, in particular the cross-sectional area of which, can be varied by a displacement of the alignment and counter-alignment elements relative to one another, wherein d) the at least one through recess on the alignment element and the at least one counter through recess on the counter alignment element each have two rectilinear edge sections which, in the respective layer, run at an oblique angle to the direction of the displacement.

The inventors have recognized that for improved positioning of the wire ends, it is important in which direction the alignment element and the counter-alignment element are displaced to each other with respect to two rectilinear edge portions of the through recess and the counter through recess.

Basically, the positioning units of the positioning device according to the invention operate with two in most cases substantially plate-shaped (possibly also curved) alignment elements, the alignment element and the counter-alignment element. On each of these, cooperating through recesses and counter through recesses are provided, which together provide a clear positioning passage through both alignment elements in a closed position.

The through recesses, in turn, have at least two rectilinear edge portions which, as end faces of the alignment elements, can abut the wire ends to be positioned when the wire ends to be positioned, which are often present in individual wire end groups of two or more wire end groups to be positioned, are guided through the respective through recesses and counter through recesses. The edge sections of an alignment element are arranged to each other in such a way that they converge roughly against the displacement direction of the alignment elements. This means that the clear positioning passage is reduced by the displacement of the two alignment elements relative to each other.

If the displacement path is now selected such that the direction of the displacement path is at an oblique angle, i.e., not parallel and not perpendicular, to the two rectilinear edge sections, a force acts on the wire ends which gradually moves them to the desired position when the alignment elements move into the closed position, but the wire ends can still slide along the edge sections.

The vertical end faces of the edge sections of the alignment element thus lie against two opposite faces of the grouped wire ends, analogously to those of the counter-alignment element. The position of the wire ends is thus determined towards the end of the positioning process by the interaction of the two edge sections of a through recess with the two edge sections of the associated counter through recess.

The movement of the alignment elements of the first and second layer is thus carried out until the four surfaces of the wire end or of the group of wire ends are enclosed by two sides each of the through recesses in the two alignment elements and block any further movement of the alignment elements.

In principle, for the purposes of the invention, the displacement of the two alignment elements with respect to each other need only have at least one directional component along the two superimposed layers to cause the displacement to a closed position. That is, the alignment elements could also move simultaneously obliquely towards each other in such a way that the layers of the two alignment elements move towards each other. Preferably, however, the displacement path will run completely parallel to the two layers of the alignment elements.

The tangent to the displacement path can be considered as the direction of the displacement path.

By choosing the oblique angle, the wire ends can be accurately positioned with only two layers of alignment elements. The device can therefore be made much lighter and flatter, and the total applied force required for positioning can be reduced.

In addition, several positioning units can preferably be provided such that less force needs to be applied to position an equal number of wire ends within a positioning unit, because then the number of necessary through recesses per positioning unit can be reduced.

In particular, it is also possible to compensate for any dimensional deviations in the wires to be processed. Through improved heat dissipation and a compact design of the device, the material consumption of wires of the electrical machine can be reduced.

Positioning of the wire ends can be considered as positioning of the wire ends relative to each other, e.g., pressing two wire ends together, as well as positioning of the wire ends relative to other wire ends or other components of the electrical machine.

For the invention, it is basically irrelevant whether the counter-alignment element is displaced relative to a stationary alignment element or vice versa, since the two alignment elements need only be displaceable relative to each other. Particularly advantageously, the positioning unit can even be mounted floatingly with respect to the wire ends, such that both alignment elements move with respect to each other during the displacement and the positioning unit itself is arranged over a plurality of wire ends with respect to the component of the electrical machine.

Preferably, it is provided that the displacement path is straight.

Although curved or meandering displacement paths are also conceivable in principle, a linear movement of the alignment element with respect to the counter-alignment element represents a simpler design.

Preferably, it is provided that the two rectilinear edge portions of the at least one through recess and/or of the counter through recess extend perpendicular to each other.

This allows the rectilinear edge sections to optimally abut wire ends with rectangular or square cross-sections. The vertical end faces of the edge sections of the alignment element can thus lie flat against two surfaces of the wire ends to be positioned during the positioning process. The remaining two surfaces of the wire ends to be positioned are contacted by the edge sections of the counter-alignment element.

Especially when using wire ends with a round or other (for example, hexagonal) cross-section, the edge sections can also converge under a different angle. In particular, the rectilinear edge sections also do not have to be directly adjacent to one another. For example, at an imaginary intersection of the edge sections, the through recess can have a concavely curved connection point in which, for example, minor injuries to the edges of the wire ends can be accommodated.

Preferably, it is provided that the through recess and/or the counter through recess is a through opening.

Since the two alignment elements of the first and second layer cooperate for the positioning, it is basically not necessary that the through recess and/or the counter through recess have a completely closed circumference. That is, the through recesses can be arranged at the edges of the alignment elements. However, a through opening has the advantage that higher forces can be exerted with the same thickness of the respective alignment element. In addition, areas around the clear positioning passage can be better covered, if necessary.

Each passage opening can thus have two edge sections which are preferably at right angles to each other. The openings can be rectangular, square, triangular, or drop-shaped, for example. The two rectilinear edge sections may be connected by a rounded corner. The shape and/or size of the openings may be adapted to the shape or size of the wire ends.

A positioning unit may include recesses and/or openings of various sizes and shapes. The alignment element and the counter-alignment element may comprise openings of different sizes and/or shapes.

The number of recesses and/or openings per alignment element and/or per clamping unit may vary.

Preferably, the through recess and/or the counter through recess are designed in such a way that the positioning passage completely encloses the at least one wire end group.

This ensures reliable positioning. Preferably, the through recess and/or the counter through recess enclose the wire ends in such a way that, apart from the clear positioning passage, no further clear passage remains through the two alignment elements when the positioning unit is in a positioning position/closed position. In particular, no more clear passage remains around the wire ends inside the outer boundaries of the alignment element and the counter-alignment element.

The through recesses of the two alignment elements are preferably designed so that the gap between the wire and the alignment element is a maximum of 0.1 mm in the closed position. Wires with shape deviations result in larger gaps.

Preferably, the displacement along the displacement path is generated by a force element.

Such a force element can be an active force element such as an actuator, e.g., a hydraulic or pneumatic piston, an electric motor or the like. However, a passive force element such as a spring or an elastic material block can also serve as the force element. The force element may also comprise a lever gear.

Most importantly, in an initial state, the passive force element can push the two alignment elements to the closed/positioning position. An opening actuator can then be used for opening, which works actively against the spring force of the passive force element. The device is thus preferably normally closed (NC), i.e., the force element exerts a force in the initial state to keep the alignment elements closed.

Preferably, the displacement of the alignment element relative to the counter-alignment element of a positioning unit is caused by a common force element. One force element per positioning unit is thus positioned in such a way that the edge sections of the through-openings in the two alignment elements, which are at right angles to each other, move towards each other.

Preferably, the positioning unit operates as a clamping unit by clamping the at least one wire end between the alignment element and the counter-alignment element.

Although the wire ends can also be positioned by contacting only one of the two alignment elements, the wire ends are optimally held in position by clamping. The positioning device thus becomes a clamping device. In particular, the force element will be designed for this purpose such that the at least one wire end is clamped between the alignment element and the counter-alignment element.

The force element may further have a maximum force limit to limit the load on the wire ends.

Also, the fact that the positioning device may comprise several positioning units helps to keep the maximum force of each positioning unit smaller.

Preferably, it is provided that the positioning device comprises a plurality of positioning units arranged annularly around a center and the direction of displacement is not directed towards the center.

Thus, the positioning force acting on the wire ends is also not directed towards the center. Due to the angle between the direction of displacement and the rectilinear edge sections of the through recesses, the wire ends are aligned simultaneously in both radial and tangential directions. The direction of the force causing the displacement is oblique to the edge sections.

Preferably, it is provided that the direction of the displacement has an angle of more than 0° to about 70°, in particular between about 10° and about 45°, to the radius of the annular arrangement.

Particularly preferably, the tangent to the displacement path has an angle of less than 70°, in particular an angle of 10° C. to 45° C. to the radius of the annular arrangement. By selecting the angle, the force component which is applied to the wire ends in the radial or tangential direction can be optimized and, for example, the pressing together of the longitudinal sides of two wire ends can be reinforced by increasing the force component in the radial direction. Particularly preferred are angles of 30° to 45° between the axis of displacement and the radius of the annular arrangement, since here the force components in the radial and tangential directions are approximately equal.

Preferably, the multiple positioning units can be controlled individually, in groups or all together by an opening mechanism.

This allows a process for positioning the wire ends that is suitable for mass production, even when using several positioning units that are closed in the normal state. In particular, the force applied by the opening mechanism can be adjusted individually. This means that adjacent positioning units can be activated independently of each other and do not influence each other. Also, by influencing the force effect of the force element via the opening mechanism, it can be avoided that the alignment elements and/or the wire ends are damaged in case of misalignment of the wire ends.

In general, each alignment element thus comprises at least one through recess or opening which is designed to enclose at least one wire end. Preferably, a through recess or opening is adapted to enclose two or three wire ends. The number of through recesses or openings of each layer corresponds to the number of wire end groups to be positioned, preferably consisting of two or three wire ends. In a preferred embodiment, each alignment element comprises nine through recesses or openings. Each clamping unit positions and clamps as small a number of wire ends as possible. Thus, the tensioning forces within a unit are reduced and the risk of damage or unwanted deformation of the wires is reduced.

Independent of or complementary to the above ideas of the invention, another aspect of the invention relates to a positioning device for positioning wire ends in the manufacture of an electrical machine, comprising:

a) at least one positioning unit comprising:

b) an alignment element and a counter-alignment element, which are arranged in two parallel layers one above the other and are displaceable relative to each other along a displacement path, at least partially overlapping or superimposable, c) wherein the alignment element has at least one through recess and the counter-alignment element has at least one counter through recess, which are arranged and designed in such a way that a clear positioning passage remains perpendicular to the two layers of the alignment element and the counter-alignment element, through which at least one wire end can extend and the cross-section of which, in particular the cross-sectional area of which, can be changed by a displacement of the alignment and counter-alignment elements relative to each other, wherein d) the alignment element and/or the counter-alignment element have a heat dissipation contact at least in the region of the through recess ($24a$) or the counter through recess ($24b$).

The most precise possible contact between the closed alignment elements and the wire ends (in particular, also enclosing the wire ends) is not only necessary for the most efficient possible force transmission, but also contributes to better heat transmission. When using the positioning device in processes with heat generation at the wire ends, at least part of this heat must be dissipated via the device in order to avoid damage to the workpiece to be machined, in particular a component of an electrical machine. Often the wires to be processed have a coating which melts at too high temperatures and is damaged.

For good heat dissipation via the alignment element and/or the counter-alignment element, the contact surface as heat dissipation contact between wire and alignment element must be as large as possible. The end faces of the alignment elements enclosing the wire ends must therefore be positioned as close as possible to the wire ends and adapted to their contour. They are also influenced by the thickness of the metal sheets used for the alignment elements.

In addition to the contact area, the material of the device, in particular of the alignment elements, also has a major influence on the heat balance, since materials with high thermal conductivity favour heat dissipation from the point of origin. Preferably, therefore, the heat dissipation contact is made of a more thermally conductive material than the steel commonly used for the alignment elements. Preferably, the material of the heat sink contact comprises copper, copper alloys, in particular CuCrZr, or aluminum, aluminum alloys, in particular AlZnMgCu. The heat dissipation contact can also be designed as a coating of the alignment elements on the entire surface or only parts thereof with a material with high thermal conductivity, such as copper.

It is also advantageous to apply several layers to one component, in particular a layer of graphite as well as a layer of copper. This can also improve the thermal conductivity.

According to a further aspect of the invention, a surface of the positioning device may have, at least in a partial region, a coating comprising diamond-like carbon (DLC) to prevent the adhesion of deposits due to the machining of the wire ends. In particular, the surface may be that surface of the alignment element facing toward the wire ends to be machined.

In order to protect the machine element to be machined from resulting deposits during machining and to facilitate insertion of the wire ends into the openings of the device, the positioning device may comprise a base plate. The base plate can have a plurality of openings which have a larger circumference on the side facing the machine element than on the side facing the alignment elements. This closing disc can cover gaps and openings between the alignment elements and prevent contaminants such as weld spatter from entering the electrical machine.

However, independently of the alignment elements, the base plate can also act as a heat dissipation contact.

According to a further aspect of the invention, there is provided a positioning device for positioning wire ends of an electrical machine, wherein the wire ends are in groups of two or more wire ends, comprising:

a first layer comprising an alignment element A or a plurality thereof,
    a second layer comprising a counter-alignment element B or a plurality thereof,
    each alignment element having one or more openings adapted to enclose at least two wire ends;
    each opening having at least two edges which are at right angles to each other;
    the alignment elements are arranged such that the wires to be positioned can be guided through the openings of one alignment element of each of the first and second layers;
    wherein
    the application of force to each alignment element A and/or B can be controlled individually by an opening mechanism.

Preferably, the electric machine is an electric motor, in particular a stator. Preferably, the device according to the invention for positioning wire ends of an electric machine is used for a method for welding the wire ends.

The method according to the invention for positioning and processing wire ends in the manufacture of an electrical machine, comprises the following steps:

a) providing a positioning device according to any one of the preceding claims;
    b) guiding a wire end through the positioning passage;
    c) aligning the wire end by moving the alignment element and the counter-alignment element with respect to each other;
    d) machining the wire end, in particular with an energy beam.

Preferably, the processing of the wire end in step d) comprises welding two or more wire ends with an electron beam.

In particular, the above considerations have in common that the two rectilinear edge sections provided both at the alignment element and at the counter-alignment element preferably run in such a way that the edge sections still run obliquely to the direction of the displacement, especially also towards the end of the displacement path. As a result, a force which deviates from the perpendicular to the edge sections acts on the wire ends, especially also at the end of the displacement. This causes a positioning force to act on the hairpins in both radial and tangential directions relative to an axis of rotation of the electrical machine.

In particular, since in the case of rectangular hairpins their side surfaces are aligned radially and tangentially, according to the present invention the displacement direction can preferably run approximately diagonally to the rectilinear edge sections. However, the displacement direction can also deviate from the diagonal by between about plus plus/minus 20°, preferably about plus/minus 10°.

With respect to the entire positioning device, the basic idea of the invention can also be expressed by the fact that, in the case of a plurality of positioning units arranged in an annular manner, the displacement direction of each individual positioning unit runs at an angle to the radial direction of the respective positioning units particularly at the end of the displacement, the displacement direction also deviating from the tangential direction at the same time. In particular, the angle can be between about 10° and 80°, especially between about 30° and 60°, preferably between about 40° and 50°. Optimally, the angle is about 45°, since the positioning force at the end is then about the same in the radial and tangential directions.

With such a positioning device, all the wires to be processed can be positioned simultaneously, even if they are arranged in different radial directions.

BRIEF DESCRIPTION OF THE DRAWINGS

In the following, embodiments of the invention are explained in more detail with reference to the drawings.

FIG. 5a is a positioning unit in the opened state;

FIG. 5b is a positioning unit in the closed state;

FIG. 6a is a schematic representation of a side view of a further embodiment of a positioning device for positioning wire ends with lateral alignment;

DESCRIPTION OF PREFERRED EMBODIMENTS

Figure 1:
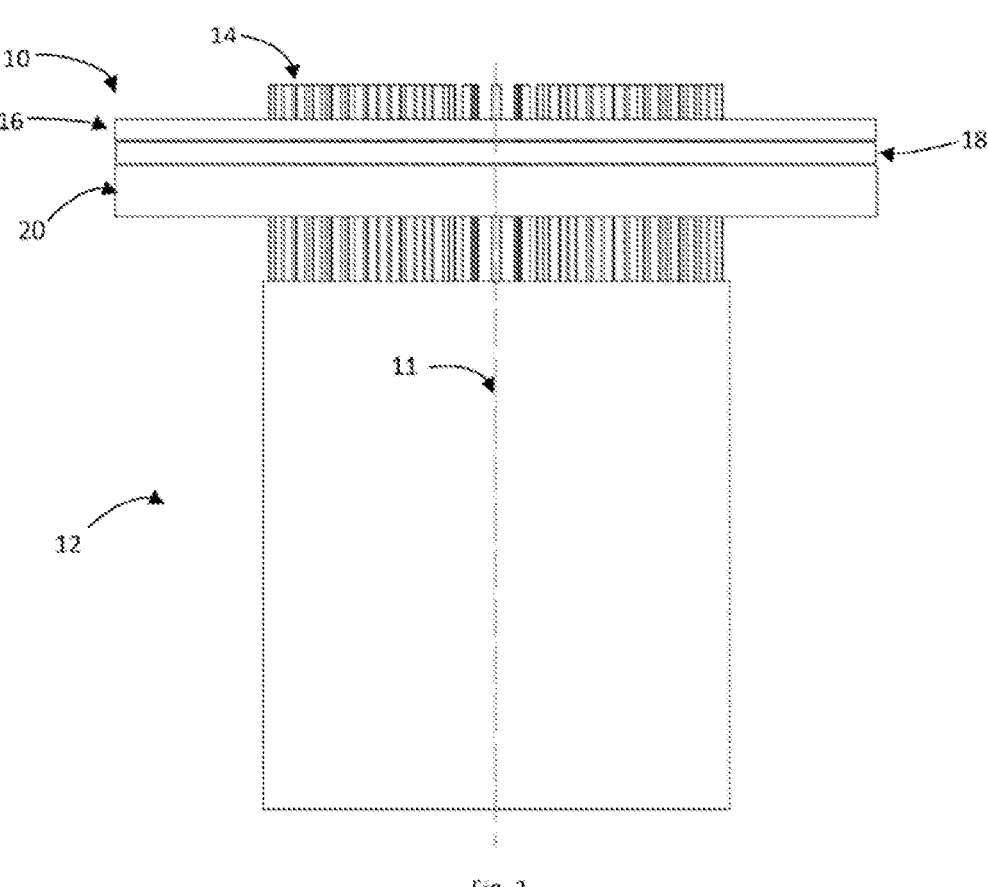
FIG. 1 is a schematic representation of a side view of a machine element and a positioning device.

FIG. 1 shows a first embodiment of the device 10 according to the invention in a mounted state on a machine element 12. The machine element 12 shown in FIG. 1 merely by way of example is a stator of an electric motor.

A stator is usually formed from a winding of a plurality of wires 14. In one embodiment, these wires are formed in a hairpin shape and are also referred to as hairpins. In particular, these hairpins consist of a copper wire which, in the embodiment shown in FIG. 1, is formed as a flat wire with a rectangular cross-section and is coated with an insulating varnish.

Hairpins typically have a bent area and two wire ends and are designed in a precisely predetermined shape to make the winding of the stator as tight as possible. Due to the winding of the hairpins and the relatively large wire thickness, a considerable amount of force is required to push the wire ends 14 into a suitable position to perform high quality machining operations on the wire ends.

For this purpose, a multi-part positioning device 10 is mounted on the stator element 12 to be machined.

The positioning device 10 has a base plate 20 as the lowest layer, which serves as a threading aid for the wire ends 14. In addition, the base plate 20 protects the stator from contaminants generated by machining and provides stability to the positioning device 10.

Figure 2:
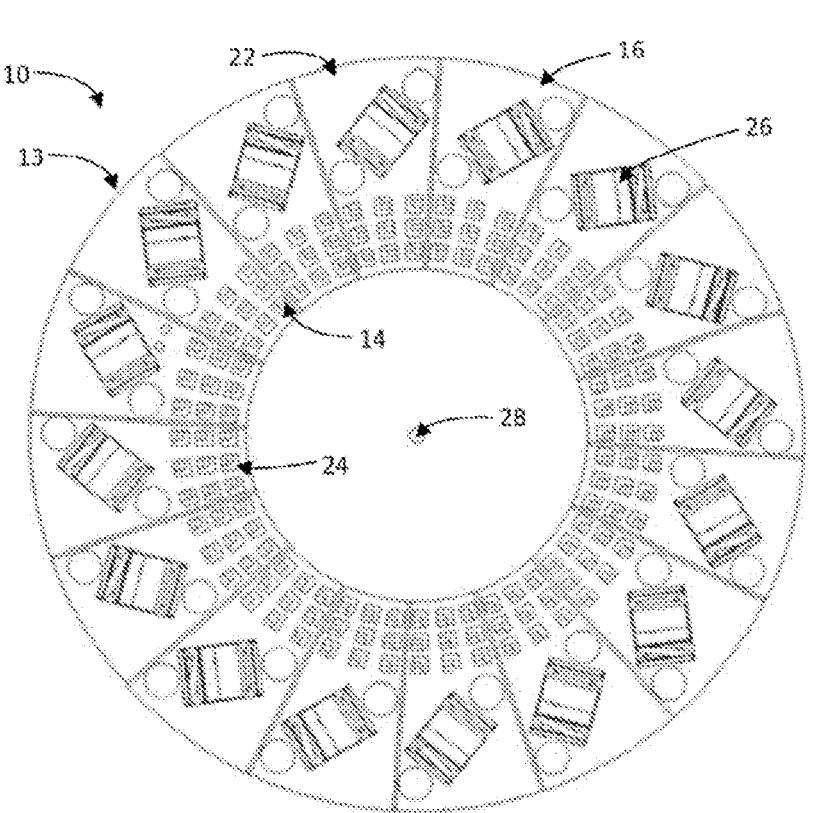
FIG. 2 is a schematic representation of a top view of the positioning device according to the invention.

Above the base plate 20, as shown in FIG. 2, the positioning device 10 comprises a plurality of positioning units 13, each comprising a plate-shaped alignment element 22a in a first position 18 and a plate-shaped counter-alignment element 22b in a second position 16. The alignment elements 22a, 22b may be formed from sheets having a thickness of approximately 1-5 mm.

The alignment elements 22a of the first layer 18 and the counter-alignment elements 22b of the second layer 16 are arranged annularly symmetrically about a center 28 which, in the assembled state of the positioning device 10, coincides with a central axis of the stator 12. In this regard, the alignment elements 22a and 22b have substantially a pie segment shape, leaving an area around the center 28 free and thus lacking the tip of the pie segments.

The alignment elements 22a and 22b have a plurality of through openings 24 to receive the wire ends 14 of the stator 12 to be positioned.

Figure 8:
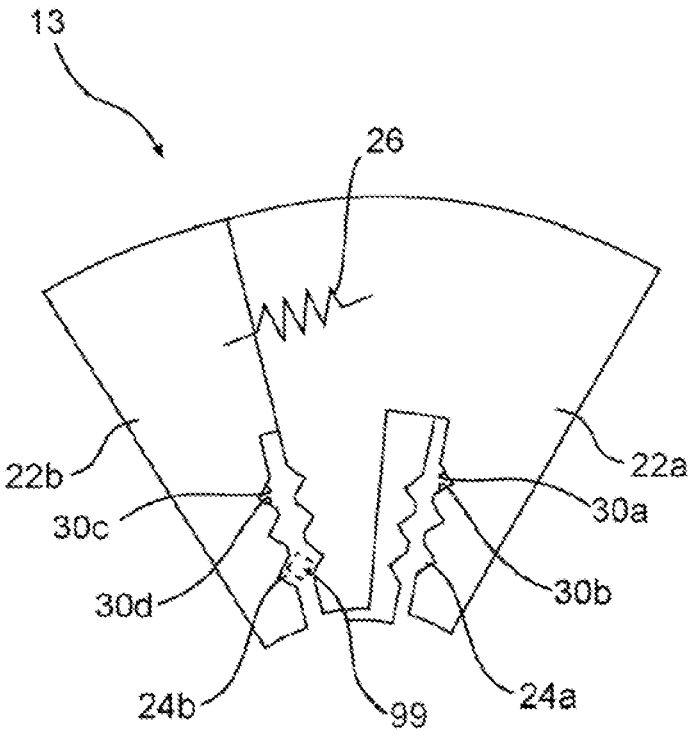
FIG. 8 is a top view of a positioning unit with recesses.

Alternatively, however, the through openings 24a, 24b may be formed as through recesses 24a, 24b open on one side, for example in that the alignment elements 22a and 22b comprise fingers directed towards the center 28 as shown in FIG. 8, on which the through recesses 24a, 24b are arranged laterally.

Figure 3:
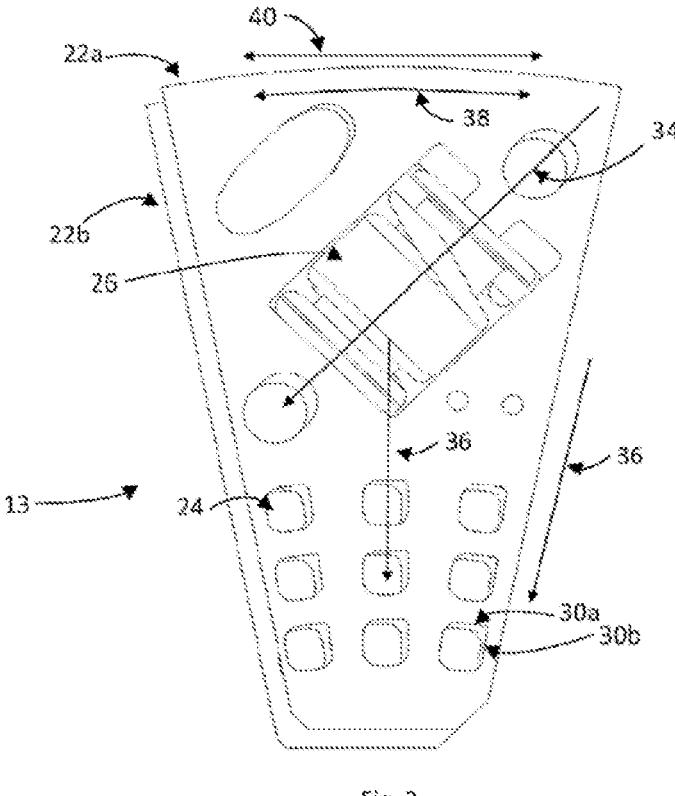
FIG. 3 is a schematic representation of an alignment element.

FIG. 3 shows a single positioning unit 13 in detail. Therein, it can be seen that the positioning unit 13 includes a passive force element 26 in addition to the alignment element 22a and the alignment element 22b. In this embodiment, a spring has been selected as the passive force element 26 which provides the force 34 for displacing the alignment elements 22a and 22b to close the positioning unit 13.

The passive force element 26 is positioned in such a manner that the respective rectilinear edge portions 30a, 30b of the through openings 24a, which are at right angles to each other, and the two rectilinear edge portions 30c, 30d of the counter through opening 24b in the two alignment elements 22a and 22b move toward each other.

Each opening 24a, 24b of the alignment elements 22a, 22b here has at least two rectilinear edge portions 30a, 30b, 30c, 30d which are at right angles to each other. The perpendicular edge portions 30a, 30b of the alignment element 22a of the first layer 18, abut two surfaces of a group of two or more wire ends 14 during the positioning and clamping process.

In this embodiment, a through opening 24 has a rectangular shape which has three strongly rounded corners and one less strongly rounded corner.

The edge portions, i.e., end faces of the alignment elements 22a, 22b, which adjoin the less strongly rounded corner, abut the wire ends 14 in the closed state.

In this embodiment, the two edge portions 30a and 30c are arranged parallel to the tangents 70 of the circumference of the positioning device 10. If the wire ends 14 of the electrical machine 12 to be processed are arranged differently, the through openings 24 of the alignment elements 22a, 22b must also be adapted.

Figure 4:
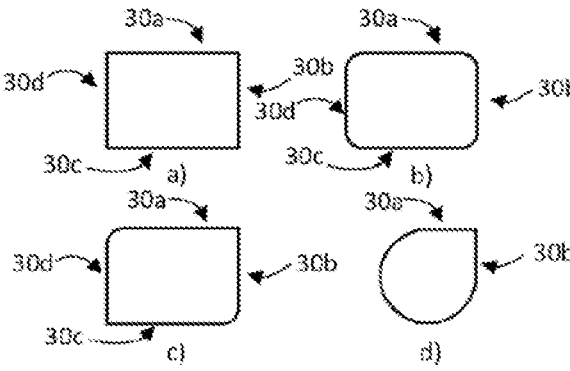
FIG. 4 illustrates embodiments of the openings in the alignment elements.

The through openings 24 of the alignment elements 22a, 22b can be designed in different shapes (see FIG. 4). In addition, the through openings 24 of the alignment element 22a can be different from those of the counter alignment element 22b.

FIG. 4a shows a rectangular opening 24. The rectangular opening 24 may be rounded at all corners (FIG. 4b), or only at two (FIG. 4c). In one embodiment, the opening 24 has only one corner with two adjacent straight edge sections 30a, 30b and is otherwise drop-shaped (see FIG. 4d). The adjacent edge sections must be long enough to enclose two sides of the wire ends 14.

The vertical end faces of the openings 24 of the alignment element 22b of the second layer 16 are opposite the vertical end faces of the alignment element 22a of the first layer 18, respectively.

The alignment elements 22b of the second layer 16 may move along the same linear axis 34 of the alignment elements 22a of the first layer 18, but in opposite directions, during positioning and clamping. However, they may also be fixed.

The linear axis 34 along which the displacement path of the alignment elements 22a, 22b runs is defined by two slotted holes 35. It is conceivable that the elongated holes 35 are bent so that the displacement path no longer runs in a straight line.

The linear movement of the alignment elements 22a, 22b of the first and/or second length 18, 16 is carried out until the four surfaces of the group of wires 14 are each enclosed by two sides of the openings 24 in the two alignment elements 22a, 22b and block a further movement of the alignment elements 22a, 22b.

FIG. 5a shows a clamping device in open condition.

The number of openings 24 corresponds to the number of pairs of wire ends 14 to be positioned.

The alignment elements 22a of the first layer 18 can be moved linearly to the alignment elements 22b of the second layer 16. The displacement is at an oblique angle to the edges 30.

In the embodiment shown in FIG. 3, the spring as force element 26 is arranged in such a way that the direction of the force 34 which causes the displacement, and thus also the axis of the displacement of the alignment elements 22*a*, 22*b*, has an angle of 45° to the edge sections 30*a*, 30*b*, 30*c*, 30*d*, respectively.

Moreover, in this embodiment, the edge portion 30*b* is parallel to the radius of the positioning device 10, therefore the displacement is also along an angle of 45° with respect to the radius. Therefore, the movement of the alignment elements is neither in the circumferential direction 38 nor radial 36 to the symmetrical arrangement. The direction 34 of the linear movement is inclined at an angle with respect to the edge sections 30*a*, 30*b*, 30*c*, 30*d* and does not pass through the center 28 of the symmetrical arrangement.

Because of the angle, a portion of the force acts on both the edge section 30*a* and the edge section 30*b*. This causes the wire ends 14 to be aligned in both the radial and tangential directions. This force presses the edge portions 30*a* and 30*b* and the edge portions 30*c* and 30*d* of the alignment element 22*b* against the side surfaces of the wire ends 14, enclosing them opaque and positioning them precisely (FIG. 5*b*).

This can be seen in FIG. 5*b* especially by a smaller cross-sectional area of a clear positioning passage 99 through the passage openings 24*a*, 24*b* of the two alignment elements 22*a*, 22*b* compared to FIG. 5*a*.

Adjacent positioning units 13 operate independently of each other and do not influence each other. To open the independent positioning units 13, openers are used which are moved centrally via a cam plate (not shown). The number of openers corresponds to the number of positioning units 13.

In the inactive state, the force element 26 or the force elements 26 are permanently closed. This means that the spring force of the force element 26 acts permanently on the wire.

Each positioning unit 13 positions and clamps as few wire ends 14 as possible, thus keeping the positioning forces within a positioning unit 13 as low as possible. The positioning force of a positioning unit 13 therefore does not lead to damage or unwanted deformation of a larger number of wire ends 14 in the event of a fault.

Figure 6B:
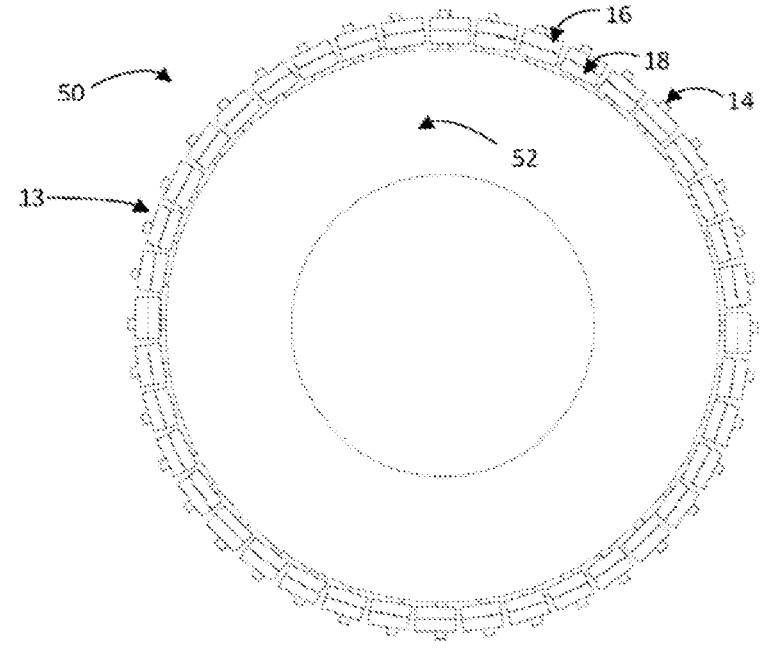
FIG. 6b is a schematic representation of a top view of the positioning device for positioning wire ends with lateral alignment.

FIG. 6 shows a further embodiment of the device according to the invention. This positioning device 50 positions wire ends 14, which do not have to be machined from above on a stator 12 as shown in FIG. 1, but from the side. The end faces of the wire ends 14 to be machined thus point radially outwards.

The positioning device 50 can have an alignment element in the form of a ring with lateral openings 24, or a plurality of alignment elements arranged in a ring. The second layer 16 is represented here by an alignment element 22*b*, which may also have the shape of a ring or a plurality of elements, but with a smaller radius. That is, the layers of the alignment elements 22*a*, 22*b*, which are arranged parallel one above the other according to the wording of the claim, can also be curved and arranged one above the other in the radial direction of the stator 12.

The outer wall surface of the ring is adjacent to the inner wall surface of the stator 12. The wire ends 14 are guided through the openings 24 located in the wall surfaces. The shape of the openings 24 and the direction of displacement of the aligning elements with respect to each other correspond to the embodiments described in FIGS. 1-5.

The displacement between the alignment elements 22*a*, 22*b* is again effected by at least one passive force element 26.

Figure 7A:
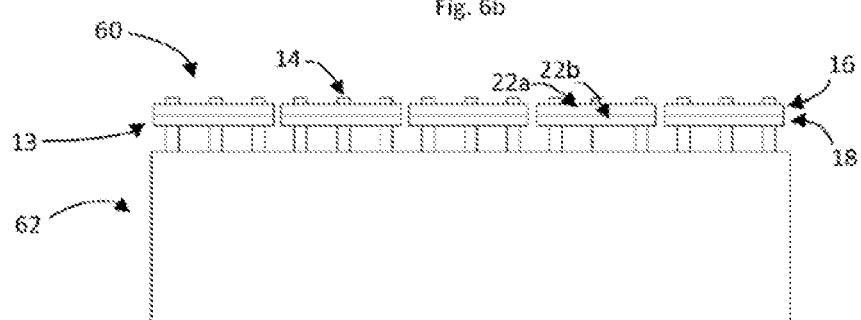
FIG. 7a is a schematic representation of a side view of a further embodiment of a positioning device for positioning wire ends of a linear motor.
Figure 7B:
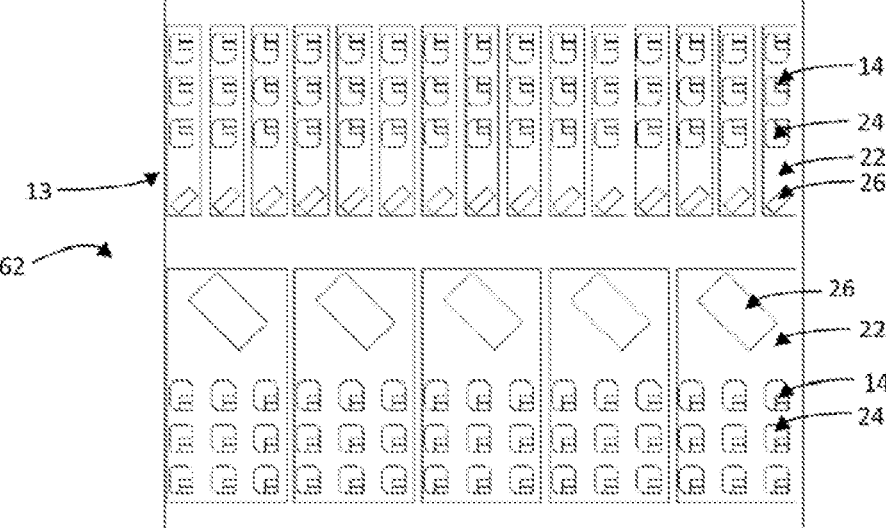
FIG. 7b is a schematic representation of a top view of the positioning device for positioning wire ends of a linear motor.

FIG. 7 shows a positioning device 60 according to the invention for positioning wire ends of a linear motor 62. In this embodiment, the alignment elements 22*a*, 22*b* of the first layer 18 and the second layer 16 are not arranged annularly around a center 28, but along a rectilinear or curved path. FIG. 7 shows a plurality of alignment elements 22*a* and 22*b*. However, the layers 16, 18 can also be represented by individual alignment elements 22*a*, 22*b* adapted to the path of the linear motor 12. The shape of the openings as well as the direction of displacement of the alignment elements with respect to each other, corresponds to that of the embodiments described in FIGS. 1-6.

The positioning method according to the invention operates as follows:

The positioning device 10 is placed on an electric machine 12 and the wire ends 14 protruding therefrom are guided in groups through the openings 24.

The alignment elements 22*a*, 22*b* are clamped by means of an opening/closing unit in such a way that the direction of displacement of the alignment elements relative to each other, is oblique to the edge sections 30*a*, 30*b*, 30*c*, 30*d*. This aligns the wire ends 14 to a precise position.

The electrical machine 12, together with the assembled positioning device 10, can then be moved to a processing chamber for further processing. There, the wire ends 14 are processed.

In a preferred embodiment, the wire ends 14 are therewith processed with an energy beam, in particular with an electron beam. The processing may comprise welding, cutting and/or stripping of the wire ends 14.

REFERENCE NUMERALS

10 Positioning device
11 Rotation axis
12 Machine element
13 Positioning unit
14 wire ends
16 first layer
18 second layer
20 base plate
22 *a, b* Alignment element
24 opening
26 elastic element
28 center of arrangement
30 *a, b, c d* edge
34 direction of force
36 radial direction
38 circumferential direction
40 tangential direction
50 device for positioning wire ends in lateral alignment
52 Machine element with laterally aligned wire ends
60 Device for positioning wire ends in a linear motor
62 linear motor

What is claimed is:

1. A positioning device for positioning wire ends in manufacture of an electrical machine, comprising:

at least one positioning unit comprising an alignment element and a counter-alignment element, which are arranged one above the other in two parallel layers and are displaceable relative to each other along a displacement path, whereby they at least partially overlap or can be overlapped, wherein the alignment element comprises at least one through recess and the counter alignment element comprises at least one counter through recess, which are arranged and designed such that a clear positioning passage remains perpendicular to the two layers of the alignment element and the counter-alignment element, through which at least one wire end can extend and whose cross-section, in particular whose cross-sectional area, can be varied by displacement of the alignment and counter-alignment elements relative to each other, and wherein the at least one through recess on the alignment element and the at least one counter through recess on the counter alignment element each have two rectilinear edge sections which, in the respective layer, run at an oblique angle to a direction of displacement.

2. The positioning device according to claim 1, wherein the displacement path is rectilinear.

3. The positioning device according to claim 1, wherein the two rectilinear edge sections of the at least one through recess run perpendicular to each other.

4. The positioning device according to claim 1, wherein the at least one through recess is a through opening.

5. The positioning device according to claim 1, wherein the at least one through recess is configured in such a way that the positioning passage completely encloses the at least one wire end.

6. The positioning device according to claim 1, wherein the displacement along the displacement path is generated by a force element.

7. The positioning device according to claim 1, wherein the positioning unit operates as a clamping unit by clamping the at least one wire end between the alignment element and the counter-alignment element.

8. The positioning device according to claim 1, further comprising a plurality of positioning units arranged annularly around a center point and the direction of displacement is not directed towards the center point.

9. The positioning device according to claim 8, wherein the direction of displacement has an angle in the range of between about 10° and about 45°, to the radius of the annularly arranged plurality of positioning units.

10. The positioning device according to one of claim 8, wherein the plurality of positioning units can each be actuated individually, in groups or all together by an opening mechanism.

11. A method for positioning and processing wire ends in the manufacture of an electrical machine, comprising:
    providing a positioning device according to claim 1;
    passing the at least one wire end through the positioning passage;
    positioning the at least one wire end by moving the alignment element and the counter-alignment element towards each other; and
    processing the at least one wire end, in particular with an energy beam.

12. The positioning device according to one of claim 9, wherein the plurality of positioning units can each be actuated individually, in groups or all together by an opening mechanism.

13. The positioning device according to claim 1, wherein the two rectilinear edge sections of the at least one counter through recess run perpendicular to each other.

14. The positioning device according to claim 1, wherein the at least one counter through recess is a through opening.

15. The positioning device according to claim 1, wherein the counter through recess is configured in such a way that the positioning passage completely encloses the at least one wire end.

* * * * *